US009854200B2

(12) United States Patent
Ono

(10) Patent No.: US 9,854,200 B2
(45) Date of Patent: Dec. 26, 2017

(54) VIDEO DISPLAY DEVICE, VIDEO DISPLAY METHOD, AND PROGRAM

(71) Applicant: JOLED INC., Tokyo (JP)

(72) Inventor: Shinya Ono, Osaka (JP)

(73) Assignee: JOLED INC., Tokyo (JP)

(*) Notice: Subject to any disclaimer, the term of this patent is extended or adjusted under 35 U.S.C. 154(b) by 0 days.

(21) Appl. No.: 15/514,949

(22) PCT Filed: Sep. 8, 2015

(86) PCT No.: PCT/JP2015/004573
§ 371 (c)(1),
(2) Date: Mar. 28, 2017

(87) PCT Pub. No.: WO2016/051680
PCT Pub. Date: Apr. 7, 2016

(65) Prior Publication Data
US 2017/0223307 A1 Aug. 3, 2017

(30) Foreign Application Priority Data
Sep. 29, 2014 (JP) ................. 2014-199072

(51) Int. Cl.
H04N 7/01 (2006.01)
H04N 11/20 (2006.01)
(Continued)

(52) U.S. Cl.
CPC ............. *H04N 7/01* (2013.01); *H04N 5/06* (2013.01); *G09G 3/3233* (2013.01);
(Continued)

(58) Field of Classification Search
CPC .......... H04N 7/01; H04N 5/06; G09G 3/3233; G09G 3/3258; G09G 3/3266; G09G 2310/062; G09G 2320/0233
(Continued)

(56) References Cited

U.S. PATENT DOCUMENTS

| 7,564,433 | B2* | 7/2009 | Hector | G09G 3/3233 |
| | | | | 345/76 |
| 7,663,615 | B2* | 2/2010 | Shirasaki | G09G 3/325 |
| | | | | 345/204 |
| 2014/0313109 | A1 | 10/2014 | Ono | |

FOREIGN PATENT DOCUMENTS

| JP | 07-115589 | 5/1995 |
| JP | 10-268261 | 10/1998 |

(Continued)

OTHER PUBLICATIONS

U.S. Appl. No. 15/514,843 to Shinya Ono et al., which was filed Mar. 28, 2017.
(Continued)

*Primary Examiner* — Trang U Tran
(74) *Attorney, Agent, or Firm* — Greenblum & Bernstein, P.L.C.

(57) ABSTRACT

A video display device includes a video obtaining unit that obtains a video represented in an input video format for displaying, at a predetermined frame frequency, frames each including an effective pixel region having n rows and m columns, p1 columns of a horizontal blanking period, and q1 rows of a vertical blanking period; a video format conversion unit that converts a format of the video to an output video format for displaying, at the predetermined frame frequency, frames each including the effective pixel region having n rows and m columns, p2 columns of the horizontal blanking period, and q2 rows of the vertical blanking period, where q2 is less than q1; and a display driver unit that displays the video row by row in a display unit at a horizontal scanning frequency in the output video format.

5 Claims, 10 Drawing Sheets

(51) Int. Cl.
*H04N 5/06* (2006.01)
*G09G 3/3258* (2016.01)
*G09G 3/3233* (2016.01)
*G09G 3/3266* (2016.01)

(52) U.S. Cl.
CPC ......... *G09G 3/3258* (2013.01); *G09G 3/3266* (2013.01); *G09G 2310/062* (2013.01); *G09G 2320/0233* (2013.01)

(58) Field of Classification Search
USPC ................................ 348/441, 443, 458, 459
See application file for complete search history.

(56) References Cited

FOREIGN PATENT DOCUMENTS

| | | |
|---|---|---|
| JP | 2003-255883 | 9/2003 |
| WO | 2013/076773 | 5/2013 |

OTHER PUBLICATIONS

International Search Report (ISR) from International Searching Authority (Japan Patent Office) in International Pat. Appl. No. PCT/JP2015/004573, dated Dec. 15, 2015.

\* cited by examiner

VIDEO DISPLAY DEVICE, VIDEO DISPLAY METHOD, AND PROGRAM

TECHNICAL FIELD

The present invention relates to a video display device, a video display method, and a program, and also relates to a technique of suppressing display unevenness.

BACKGROUND ART

An organic electro-luminescent (EL) display device, which is an example of the video display device, displays a video in a display unit in which a plurality of pixels including organic EL elements are arranged in a matrix (for example, see Patent Literature (PTL) 1).

CITATION LIST

Patent Literature

[PTL 1] WO 2013/076773

SUMMARY OF INVENTION

Technical Problem

However, in the conventional organic EL display device, display unevenness may occur in synchronization with a frame period of the video in some cases. Such display unevenness is noticeable especially in the organic EL display device that includes a large display unit and is driven at a large current.

With the foregoing in mind, it is an object of the present invention to provide a video display device that suppresses display unevenness that may occur in synchronization with a frame period of a video.

Solution to Problem

In order to solve the problem described above, a video display device according to one aspect disclosed herein includes a display unit including a plurality of pixel portions that are arranged in a matrix having n rows and m columns; a video obtaining unit that obtains a video represented in an input video format for displaying, at a predetermined frame frequency, a plurality of frames each including an effective pixel region having n rows and m columns, p1 columns of a horizontal blanking period, and q1 rows of a vertical blanking period; a video format conversion unit that converts a format of the video to an output video format for displaying, at the predetermined frame frequency, a plurality of frames each including the effective pixel region having n rows and m columns, p2 columns of the horizontal blanking period, and q2 rows of the vertical blanking period, where q2 is less than q1; and a display driver unit that displays the video row by row in the display unit at a horizontal scanning frequency in the output video format.

Advantageous Effects of Invention

In accordance with the video display device according to an aspect disclosed herein, the obtained video is displayed according to an output video format that has an equal frame frequency and a smaller number of vertical blanking rows compared with the input video format. As a result, it is possible to reduce variations in a drive current generated when vertical scanning circulates among the vertical blanking rows, so that the display unevenness caused by the variations in drive current is suppressed.

DESCRIPTION OF EMBODIMENTS (Underlying Knowledge Forming Basis of the Present Invention)

As described in the section of Background Art, in the video display device, display unevenness may occur within the frame period in some cases. To address this problem, the inventor of the present invention has found that the presence of a vertical blanking period is involved in such an occurrence of the display unevenness.

In the following, a mechanism in which the display unevenness occurs due to the presence of the vertical blanking period will be described first by way of a comparative example. Then, the description will be directed to a video display device invented by the inventor of the present invention for the purpose of solving the display unevenness.

Figure 3:
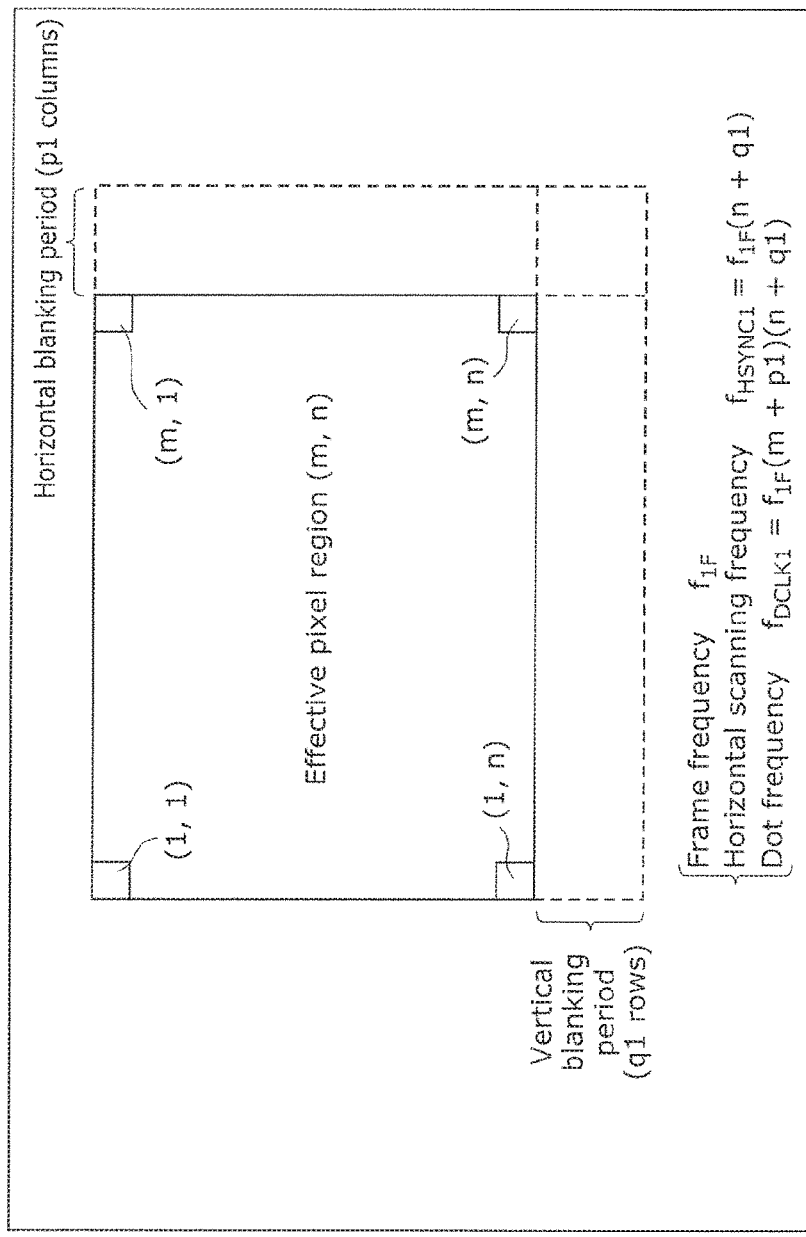
FIG. 3 is a conceptual diagram illustrating an example of an input video format.

FIG. 3 is a conceptual diagram illustrating an example of an input video format. For example, the video display device obtains and displays a video represented in such an input video format.

The input video format illustrated in FIG. 3 is a video format in which a frame includes an effective pixel region having n rows and m columns, p1 columns of a horizontal blanking period, and q1 rows of a vertical blanking period, and is a video format for displaying a plurality of such frames at a frame frequency $f_{1F}$. This input video format has a horizontal scanning frequency $f_{HSYNC1}$ of $f_{1F}(n+q1)$ and a dot frequency $f_{DCLK1}$ of $f_{1F}(m+p1)(n+q1)$.

Here, the horizontal blanking period and the vertical blanking period are provided in order to secure time presenting a horizontal synchronization signal and a vertical synchronization signal in an analog video signal, and are virtual rows and columns whose corresponding pixels do not exist in the display unit (in other words, where no actual display operation is performed).

Figure 4:
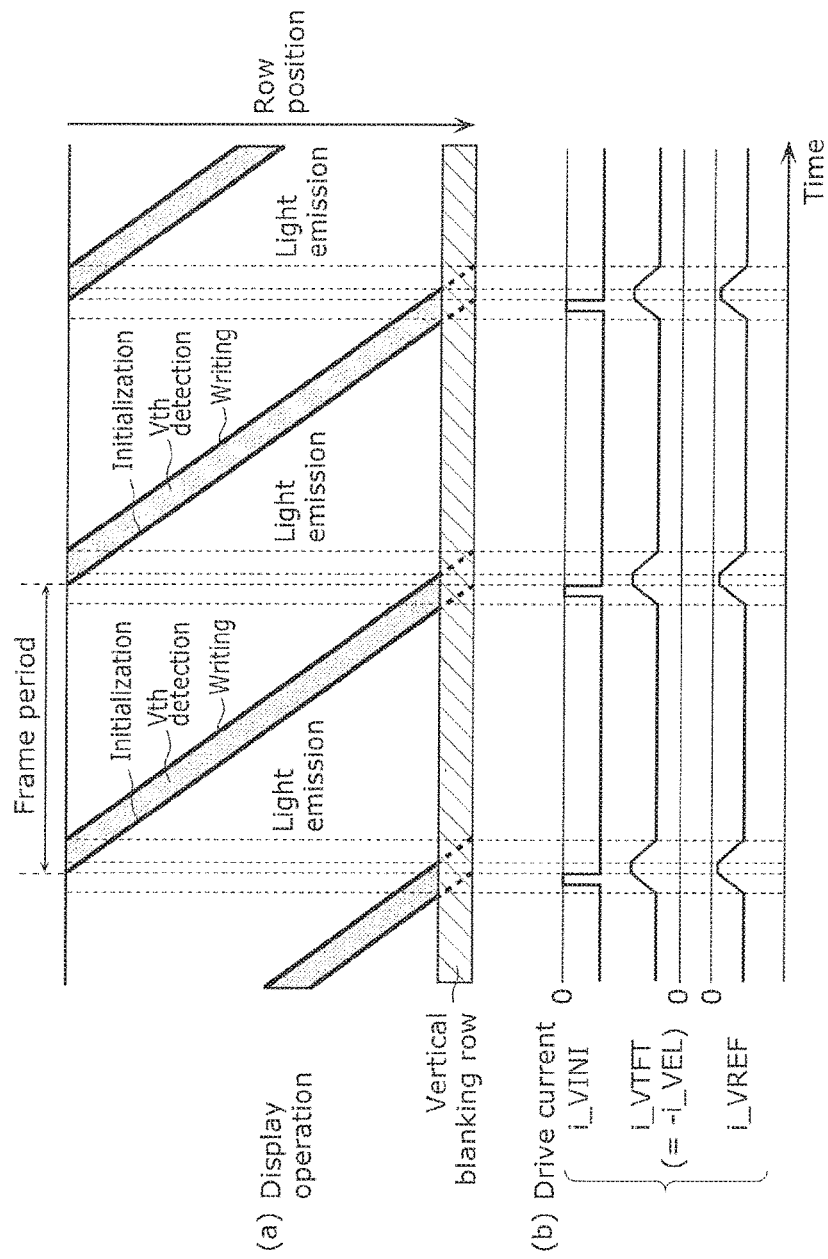
FIG. 4 is a timing chart illustrating in (a) and (b) an example of a video display operation according to a comparative example.

FIG. 4 is a timing chart illustrating an example of a video display operation according to a comparative example. FIG. 4 illustrates (a) an example of a display operation in the display unit and (b) an example of variations over time in a drive current in the entire display unit when a video is displayed according to the input video format in FIG. 3. As this display unit, a general display panel is assumed which includes a plurality of pixels that are arranged in a matrix having n rows and m columns.

(a) in FIG. 4 schematically illustrates how vertical scanning is performed in which the display operation in the individual pixels proceeds row by row in the display unit. The display operation in the individual pixels may include, for example, four steps of initialization, threshold detection (Vth detection) of a drive transistor, writing of video data (writing), and light emission.

In the vertical scanning, rows serving as a target of the display operation are switched at the horizontal scanning frequency, and all the rows including the vertical blanking rows are circulated per frame period. However, as described earlier, no corresponding pixels are present in the vertical blanking rows. Thus, no actual display operation is performed, and only the time for presenting the vertical synchronization signal in the analog video signal passes. Consequently, when the vertical scanning starts circulating in the vertical blanking rows, the number of rows in which the display operation is actually performed varies over the entire display unit.

Then, as illustrated in (b) of FIG. 4, various drive currents i_VINI, i_VTFT, and i_VREF used for the display operation vary over the entire display unit. When the drive currents vary, owing to the voltage drop of power supply lines caused by line resistance from a panel display unit to a power supply unit, for example, the power supply voltages received by individual pixels disposed in the panel display unit vary. Consequently, light emission characteristics of the individual pixels vary, resulting in display unevenness.

This is the mechanism in which the presence of the vertical blanking period causes the display unevenness within the frame period. It should be noted that the display operation in each step and each drive current illustrated in FIG. 4 will be further detailed in the section of Embodiments.

After a keen study for reducing or resolving the above-described display unevenness, the inventor of the present invention has arrived at a video display device disclosed in the following.

A video display device according to one aspect disclosed herein includes a display unit including a plurality of pixel portions that are arranged in a matrix having n rows and m columns; a video obtaining unit that obtains a video represented in an input video format for displaying, at a predetermined frame frequency, a plurality of frames each including an effective pixel region having n rows and m columns, p1 columns of a horizontal blanking period, and q1 rows of a vertical blanking period; a video format conversion unit that converts a format of the video to an output video format for displaying, at the predetermined frame frequency, a plurality of frames each including the effective pixel region having n rows and m columns, p2 columns of the horizontal blanking period, and q2 rows of the vertical blanking period, where q2 is less than q1; and a display driver unit that displays the video row by row in the display unit at a horizontal scanning frequency in the output video format.

With this configuration, the obtained video is displayed according to an output video format that has an equal frame frequency and a smaller number of vertical blanking rows compared with the input video format. As a result, it is possible to reduce variations in a drive current generated when vertical scanning circulates among the vertical blanking rows, so that the display unevenness caused by the variations in drive current is suppressed.

Furthermore, the video format conversion unit may include: a frame memory that stores the video for each frame; a clock converter that generates a horizontal synchronization signal at the horizontal scanning frequency indicated by $f_{HSYNC2}$ and a dot clock signal at a dot frequency indicated by $f_{DCLK2}$ based on relationships $f_{HSYNC2}=f_{1F}(n+q2)$ and $f_{DCLK2}=f_{1F}(m+p2)(n+q2)$, where $f_{1F}$ denotes the predetermined frame frequency; and a timing controller that reads out video data for each pixel from the frame memory based on the dot clock signal, and supplies the video data that has been read out and the horizontal synchronization signal to the display driver unit. The display driver unit may sequentially drive, row by row, a display operation in the pixel portions disposed in one of the rows of the display unit in synchronization with the horizontal synchronization signal.

With such a configuration, more specifically, timing of the video data is adjusted via the frame memory, and the display operation is sequentially performed row by row at the horizontal scanning frequency according to the output video format in synchronization with the horizontal synchronization signal. In this way, a format of the video is converted to the output video format, thus producing the above-described effects.

Moreover, the video format conversion unit may convert the format of the video to the output video format that satisfies a relationship $(m+p1)(n+q1)=(m+p2)(n+q2)$.

With this configuration, the dot frequency in the input video format is equal to dot frequency in the output video format. As a result, it becomes unnecessary to convert the dot frequency when converting the format of the video, thus simplifying the video format conversion unit.

Additionally, the video format conversion unit may convert the format of the video to the output video format that satisfies a relationship $(m+p1)(n+q1)=(m+p2)n$.

With this configuration, the vertical blanking period in the output video format is eliminated, thus making it possible to suppress the display unevenness effectively.

It should be noted that these general or specific aspects may be implemented by a system, a method, an integrated circuit, a computer program or a computer-readable recording medium such as a CD-ROM, or by any combination of a system, a method, an integrated circuit, a computer program and a recording medium.

The following is a specific description of a video display device according to embodiments, with reference to the accompanying drawings.

It should be noted that any of the embodiments described below will illustrate one specific example of the present invention. Thus, the numerical values, shapes, materials, structural components, the arrangement and connection of the structural components mentioned in the following embodiments are merely an example and not intended to limit the present invention. Furthermore, among the structural components in the following embodiments, the one that is not recited in any independent claim exhibiting the most generic concept will be described as an arbitrary structural component.

Embodiment 1

Figure 1:
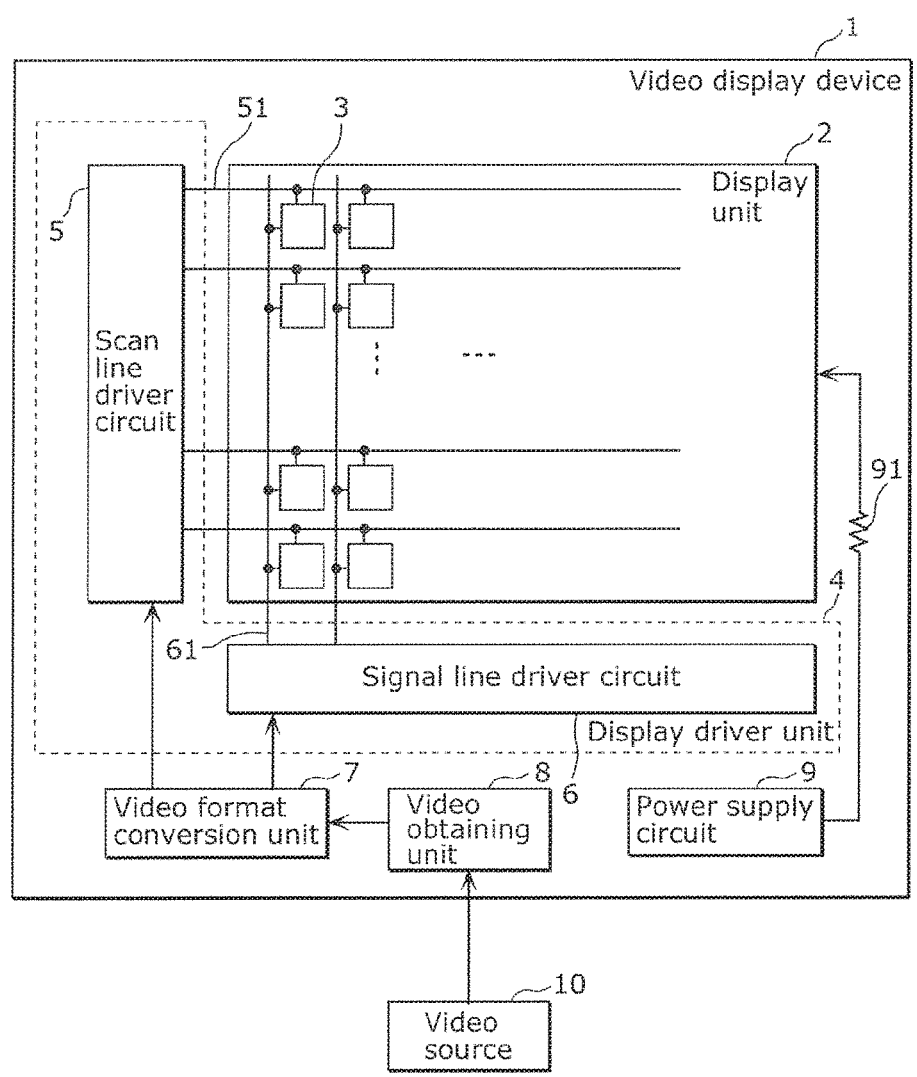
FIG. 1 is a functional block diagram illustrating an exemplary configuration of a video display device according to Embodiment 1.

FIG. 1 is a functional block diagram illustrating an exemplary configuration of an organic EL display device serving as an example of a video display device according to Embodiment 1. This video display device obtains a video represented in an input video format, converts a format of this video to an output video format that has an equal frame frequency and a shorter vertical blanking period compared with the input video format, and displays this video according to this output video format.

As illustrated in FIG. 1, the video display device 1 includes a display unit 2, a display driver unit 4, a video format conversion unit 7, a video obtaining unit 8, and a power supply circuit 9.

The display unit 2 has a plurality of pixel portions 3 that are arranged in a matrix.

The display driver unit 4 includes a scan line driver circuit 5 and a signal line driver circuit 6.

The scan line driver circuit 5 supplies a control signal for controlling a display operation, via a control line 51 provided for each row, to each of the pixel portions 3 disposed in that row.

The signal line driver circuit 6 supplies a data signal indicating light emission brightness, via a data line 61 provided for each column, to each of the pixel portions 3 disposed in that column.

The video obtaining unit 8 obtains a video represented in the input video format illustrated in FIG. 3 from an external video source 10.

The video format conversion unit 7 converts a format of the obtained video to an output video format that has an equal frame frequency and a shorter vertical blanking period compared with the input video format. The conversion of the video format will be detailed later.

The display driver unit 4 displays the video in the display unit 2 according to the converted output video format.

The power supply circuit 9 supplies a drive current via a power supply line 91 to each of the pixel portions 3.

In the following, the detailed configuration and operation of the video display device 1 will be elaborated on by way of a specific example.

Figure 2:
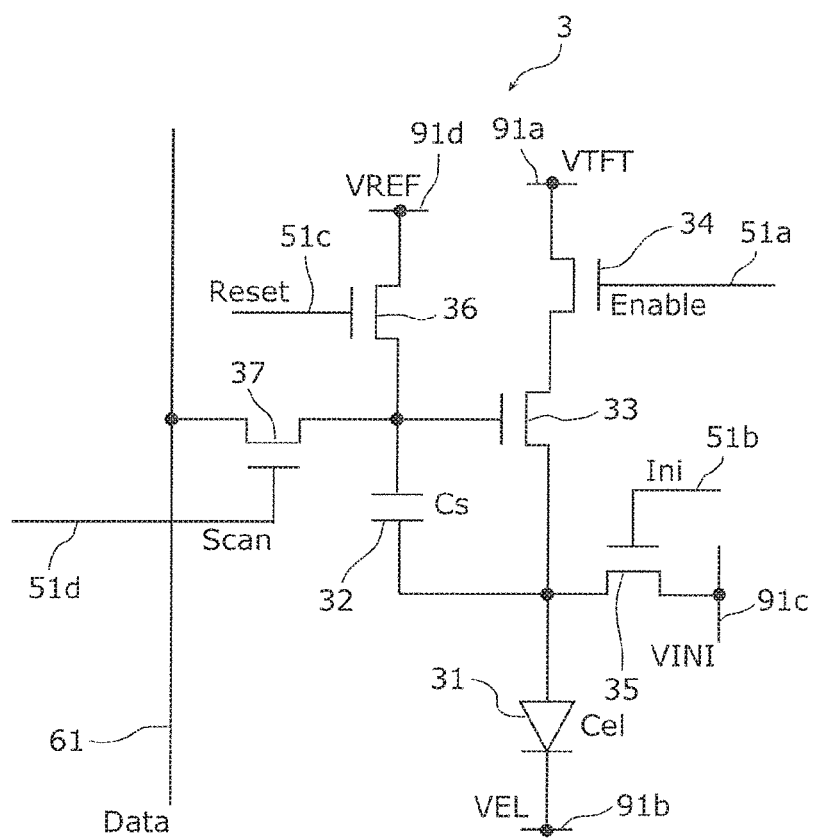
FIG. 2 is a circuit diagram illustrating an exemplary configuration of a pixel portion according to Embodiment 1.

FIG. 2 is a circuit diagram illustrating one specific example of the configuration of the pixel portion 3.

As illustrated in FIG. 2, the pixel portion 3 includes an organic EL element 31, a storage capacitor 32, a drive transistor 33, and switching transistors 34, 35, 36, and 37.

The control line 51 includes an enable control line 51a, an initialization control line 51b, a reference control line 51c, and a scan control line 51d. The enable control line 51a, the initialization control line 51b, the reference control line 51c, and the scan control line 51d transmit an enable signal Enable, an initialization signal Ini, a reset signal Reset, and a scan signal Scan, respectively, from the scan line driver circuit 5 to the pixel portion 3.

The power supply line 91 includes a first power supply line 91a, a second power supply line 91b, an initialization voltage line 91c, and a reference voltage line 91d. The first power supply line 91a, the second power supply line 91b, the initialization voltage line 91c, and the reference voltage line 91d transmit drive currents at a first power supply voltage VTFT, a second power supply voltage VEL, an initialization voltage VINI, and a reference voltage VREF, respectively, from the power supply circuit 9 to the pixel portion 3.

The pixel portion 3 performs the display operation including four steps of Vth detection, writing, and light emission as illustrated in (a) of FIG. 4, for example, using the first power supply voltage VTFT, the second power supply voltage VEL, the initialization voltage VINI, and the reference voltage VREF according to the enable signal Enable, the initialization signal Ini, the reset signal Reset, and the scan signal Scan.

The pixel portion 3 performs the display operation, for example, as follows in each of the steps. Incidentally, polarities of a current and a voltage in the following description are the ones in an exemplary case where the drive transistor 33 and the switching transistors 34 to 37 are N-type metal oxide semiconductor (MOS) transistors. The drive transistor 33 and the switching transistors 34 to 37 may also be P-type MOS transistors. In this case, the following description also holds true by reversing the polarities of the current and the voltage.

In the initialization step, the switching transistor 34 is turned OFF, and the switching transistors 35 and 36 are turned ON. A current flows out to the initialization voltage line 91c, and a source voltage of the drive transistor 33 drops to the initialization voltage VINI while a gate voltage of the drive transistor 33 is kept at the reference voltage VREF. At this time, since an anode voltage Vano of the organic EL element 31 is at a voltage dependent on a light emission state (for example, Vano(ON)>VINI) due to a light emission period preceding the initialization period, a current flows from an anode of the organic EL element 31 to the initialization power supply line 91c, so that the organic EL element 31 is charged. Here, since a potential difference VINI−VEL between the initialization voltage VINI and the second power supply voltage VEL is set to a potential difference less than a threshold voltage Vth(EL) of the organic EL element 31, the organic EL element 31 is turned OFF. When the organic EL element 31 is OFF, its capacitor functions as a capacitance of Cel. Furthermore, since a potential difference VREF−VINI between the reference voltage VREF and the initialization voltage VINI is set to a potential difference greater than a threshold voltage Vth of the drive transistor 33, the drive transistor 33 is turned ON.

In the Vth detection step, the switching transistor 35 is turned OFF, and the switching transistors 34 and 36 are turned ON. Since the drive transistor 33 has been turned ON in the initialization step, a current flows from the first power supply voltage VTFT via the switching transistor 34 and the drive transistor 33 to the storage capacitor 32 and the organic EL element 31. Moreover, in response to the current flowing into the storage capacitor 32, a current flows out to a power supply connected with the reference voltage line 91d so that a voltage of the reference voltage line 91d applying a gate voltage of the drive transistor 33 is kept constant at VREF. In other words, while the gate voltage of the drive transistor 33 is kept at VREF by the reference voltage VREF, a source voltage of the drive transistor 33 rises until a gate-source voltage reaches the threshold voltage Vth, and the threshold voltage Vth is stored in the storage capacitor 32. Thus, a source voltage of the drive transistor 33 connected with the storage capacitor 32 and the organic EL element 31 is VREF−Vth. Similarly to the case of the reference voltage VREF, in response to a current flowing into the organic EL element 31, a current flows out to a power supply connected with the second power supply line 91b so that a voltage of the second power supply line 91b applying a cathode voltage of the organic EL element 31 is kept constant at VEL.

In the writing step, the switching transistors 34, 35, and 36 are turned OFF, and the switching transistor 37 is turned ON. Since a voltage VREF−Vth stored in a threshold detection step is held at a connection node between the organic EL element 31 and the storage capacitor 32, application of a voltage Vdata of a data signal Data of the data line 61 causes the storage capacitor 32 to store a voltage of (Cel/(Cel+Cs)) (Vdata−VREF)+Vth, where Cs denotes a capacitance of the storage capacitor 32.

In the light emission step, the switching transistor 37 is turned OFF, and the switching transistor 34 is turned ON. From the first power supply line 91a via the organic EL element 31 to the second power supply line 91b, the drive transistor 33 passes a light emission drive current having a magnitude corresponding to a voltage obtained by subtracting the threshold voltage Vth from the gate-source voltage. Since contribution of the threshold voltage Vth to the light emission drive current is canceled out by the threshold voltage Vth stored in the storage capacitor 32 in the Vth detection step, the organic EL element 31 emits light at brightness accurately corresponding to the voltage of the data signal Data.

As described above, the currents according to the steps of the display operation flow in the first power supply line 91a, the second power supply line 91b, the initialization voltage line 91c, and the reference voltage line 91d.

Now, the description with reference to (a) of FIG. 4 will continue. When the vertical scanning is repeated per frame period, the number of rows present in respective steps of the initialization, the Vth detection, the writing, and the light emission among all the rows including the vertical blanking rows is always constant. However, since no actual display operation is performed in the vertical blanking rows, the drive current used in each step decreases over the entire display unit 2 as the number of the vertical blanking rows present in that step increases.

As a result, if a video is displayed according to the input video format in FIG. 3, relatively large variations occur in the drive currents i_VINI, i_VTFT (=−i_VEL), and i_VREF as illustrated in (b) of FIG. 4. Here, the drive currents i_VINI, i_VTFT (=−i_VEL), and i_VREF indicate a magnitude of respective currents flowing in the initialization voltage line 91c, the first power supply line 91a (or the second power supply line 91b), and the reference voltage line 91d in FIG. 2 over the entire display unit 2.

Such variations of the drive currents are reduced or resolved by displaying the video, which has been obtained in the video obtaining unit 8, according to the output video format having an equal frame frequency and less vertical blanking rows compared with the input video format.

Accordingly, the video format conversion unit 7 is provided in the video display device 1.

Figure 5:
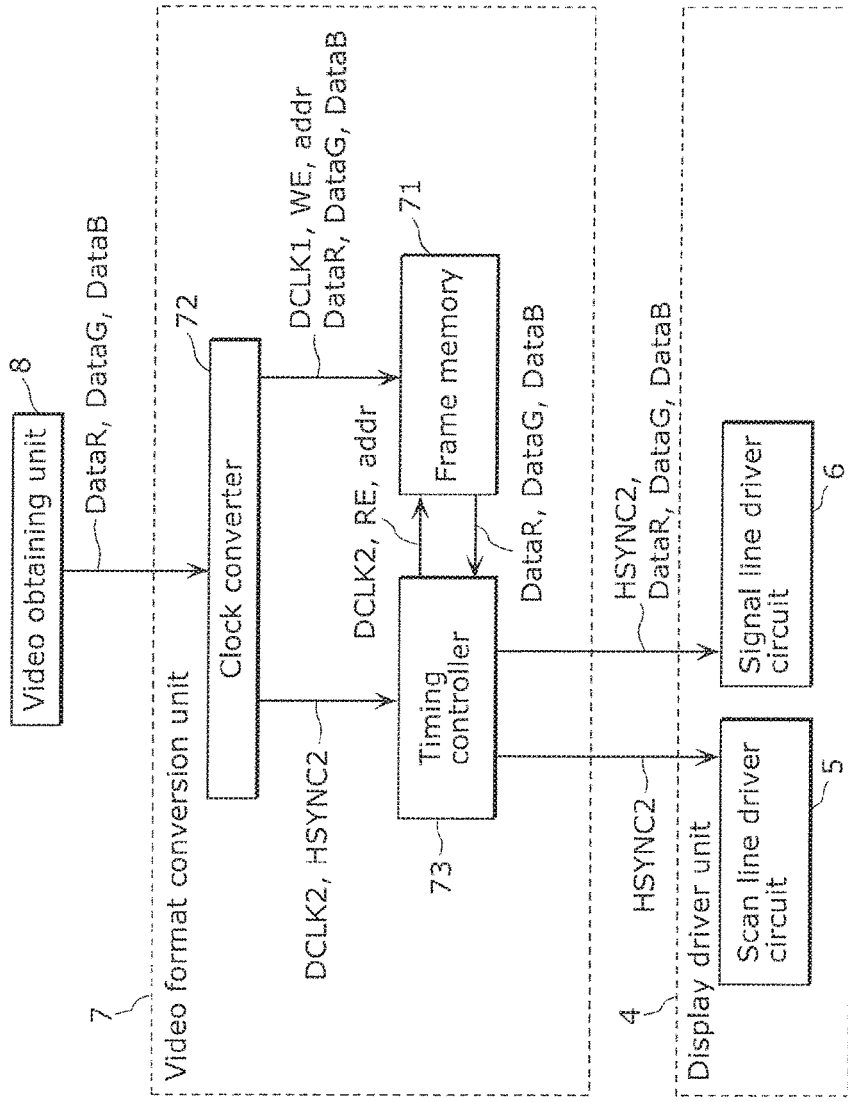
FIG. 5 is a functional block diagram illustrating an exemplary configuration of a video format conversion unit according to Embodiment 1.

FIG. 5 is a functional block diagram illustrating an exemplary configuration of the video format conversion unit 7. FIG. 5 illustrates the video obtaining unit 8 and the display driver unit 4 together with the video format conversion unit 7.

The video format conversion unit 7 is a converter that converts the format of a video from the input video format to the output video format having an equal frame frequency and less vertical blanking rows compared with that input video format, and includes a frame memory 71, a clock converter 72, and a timing controller 73.

The video format conversion unit 7 may be configured by a computer having a central processing unit (CPU), a random access memory (RAM), and a read only memory (ROM), for example. The converting function of the video format conversion unit 7 may be a software function that is performed by the CPU using the RAM as a memory for operation to execute a program stored in the ROM. Furthermore, the video format conversion unit 7 may be configured by a dedicated hardware circuit such as an application specific integrated circuit (ASIC), for example.

Figure 6:
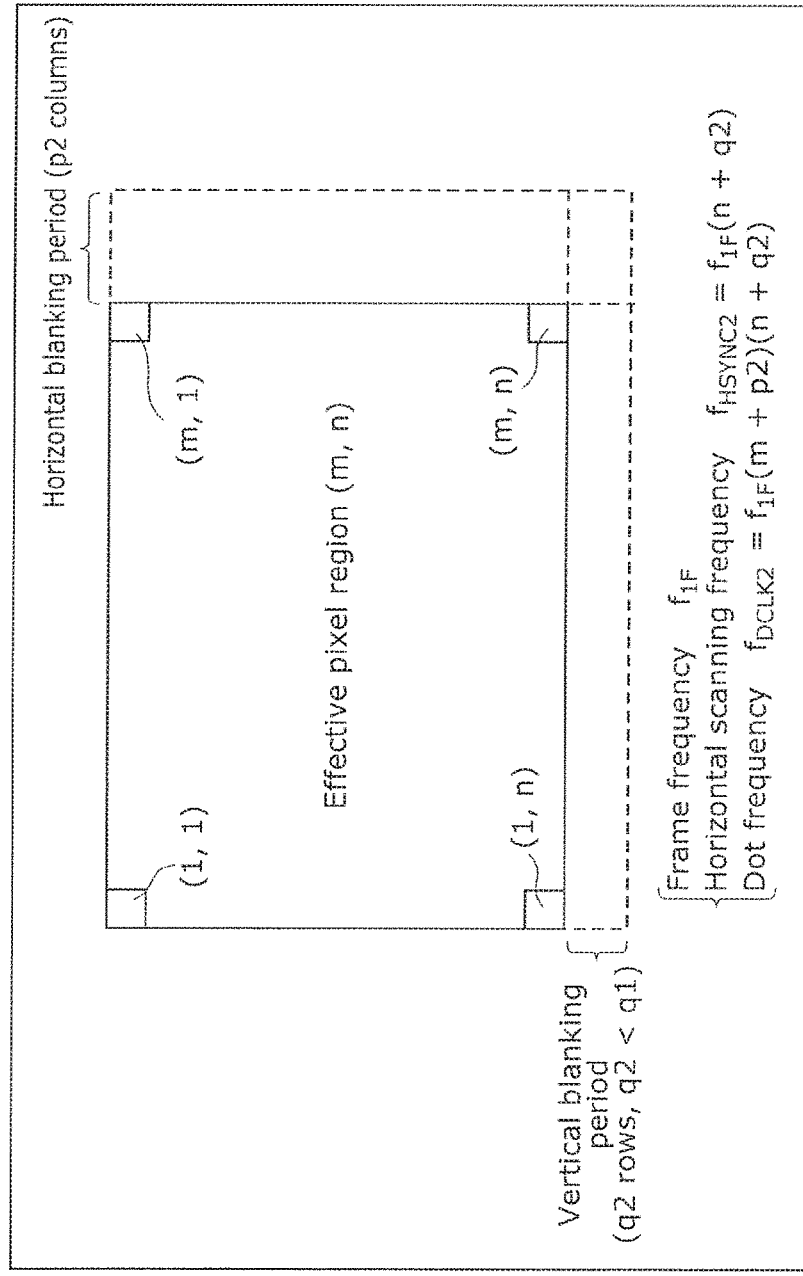
FIG. 6 is a conceptual diagram illustrating an example of an output video format according to Embodiment 1.

FIG. 6 is a conceptual diagram illustrating an example of an output video format according to Embodiment 1.

The output video format illustrated in FIG. 6 is a video format in which a frame includes an effective pixel region having n rows and m columns, p2 columns of a horizontal blanking period, and q2 (<q1) rows of a vertical blanking period, and is a video format for displaying a plurality of such frames at a frame frequency $f_{1F}$. This output video format has a horizontal scanning frequency $f_{HSYNC2}$ of $f_{1F}(n+q2)$ and a dot frequency $f_{DCLK2}$ of $f_{1F}(m+p2)(n+q2)$.

Here, the frame frequency $f_{1F}$ of the output video format is equal to the frame frequency $f_{1F}$ of the input video format. The number of the rows, which is q2, in the vertical blanking period in the output video format is less than the number of the rows, which is q1, in the vertical blanking period in the input video format.

In order to convert the format of the video from the input video format to the output video format, the video format conversion unit 7 performs the following processing.

The clock converter 72 writes into the frame memory 71 video data DataR, DataG, and DataB, contained in the video obtained by the video obtaining unit 8. It is only necessary that one frame of the video data DataR, DataG, and DataB be written in the frame memory 71 per frame period. There is no particular limitation to write timing within the frame period. As an example, the clock converter 72 may issue a write enable signal WE and an address signal addr in synchronization with a dot clock signal DCLK1 at a dot frequency $f_{DCLK1}$ in the input video format, thereby writing the video data DataR, DataG, and DataB in the frame memory 71.

The clock converter 72 generates a horizontal synchronization signal HSYNC2 at a horizontal scanning frequency $f_{HSYNC2}$ in the output video format and a dot clock signal DCLK2 at the dot frequency $f_{DCLK2}$ in the output video format based on relationships $f_{HSYNC2}=f_{1F}(n+q2)$ and $f_{DCLK2}=f_{1F}(m+p2)(n+q2)$.

The timing controller 73 issues a readout enable signal RE and an address signal addr in synchronization with the dot clock signal DCLK2, thereby reading out the video data DataR, DataG, and DataB from the frame memory 71. The timing controller 73 supplies the video data DataR, DataG, and DataB that have been read out and the horizontal synchronization signal HSYNC2 to the display driver unit 4.

In this manner, the video format conversion unit 7 converts the format of the video from the input video format to the output video format. In other words, the conversion in the format of the video performed by the video format conversion unit 7 is conversion in timing of the video.

The display driver unit 4 sequentially drives, row by row, a display operation in the pixel portions 3 disposed in one of the rows of the display unit 2 in synchronization with the horizontal synchronization signal HSYNC2.

In the display driver unit 4, the scan line driver circuit 5 performs, row by row, an operation of supplying a control signal for executing the four steps of the initialization, the Vth detection, the wiring, and the light emission to the pixel portions 3 disposed in one of the rows via the control line 51 of that row in synchronization with the horizontal synchronization signal HSYNC2. Furthermore, the signal line driver circuit 6 supplies the video data DataR, DataG, and DataB to the pixel portions 3 in each row via the data line 61 of each column in synchronization with the horizontal synchronization signal HSYNC2.

In this manner, the display driver unit 4 displays the video in the display unit 2 row by row at the horizontal scanning frequency of the output video format.

Figure 7:
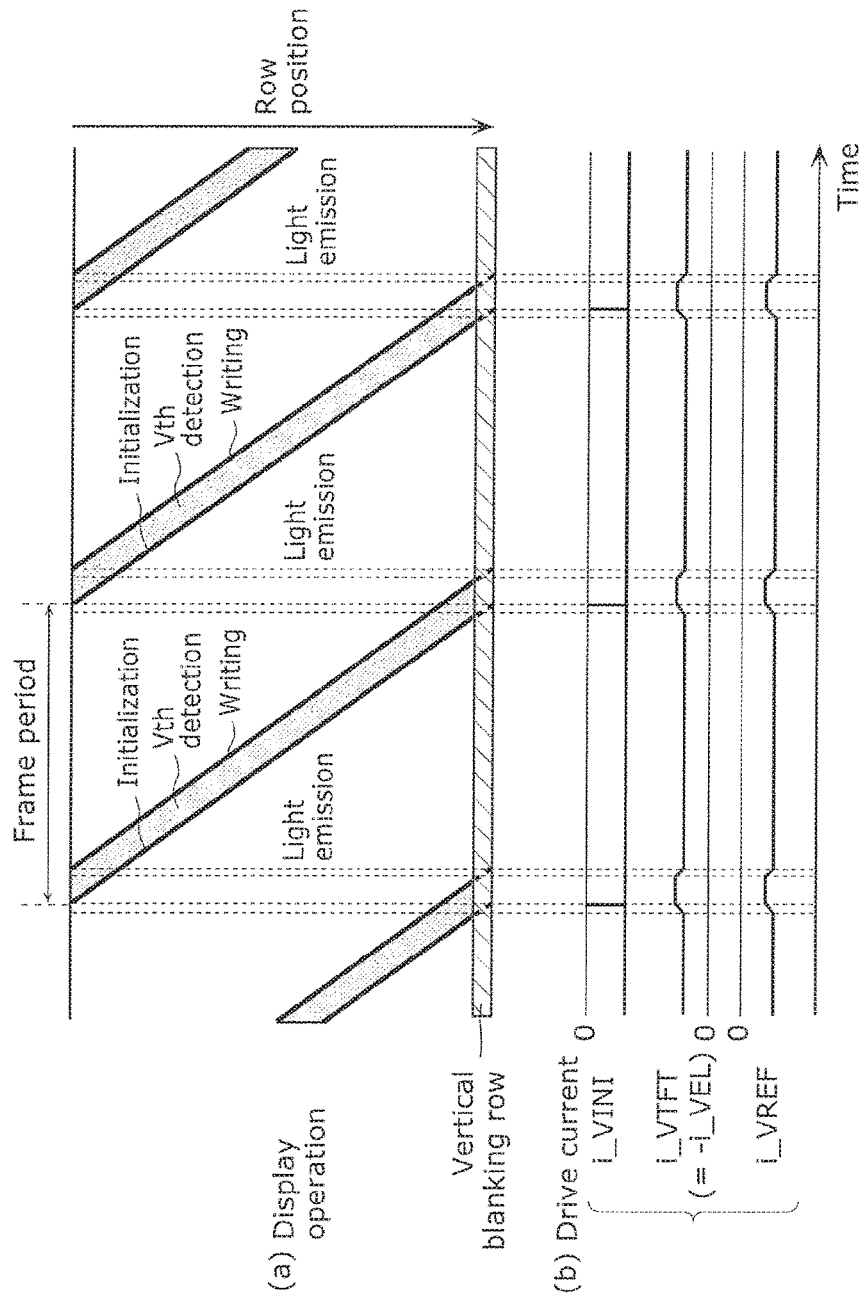
FIG. 7 is a timing chart illustrating in (a) and (b) an example of a video display operation according to Embodiment 1.

FIG. 7 is a timing chart illustrating an example of a video display operation according to Embodiment 1. Similarly to FIG. 4, FIG. 7 illustrates (a) an example of the display operation in the display unit and (b) an example of the variations over time in the drive current in the entire display unit when a video is displayed according to the output video format in FIG. 6.

As illustrated in (a) of FIG. 7, the video is displayed according to the output video format having less vertical blanking rows compared with (a) of FIG. 4. As a result, as illustrated in (b) of FIG. 7, it is possible to reduce variations in a drive current generated when vertical scanning circulates among the vertical blanking rows, so that the display unevenness caused by the variations in drive current is suppressed.

In the above configuration, the video format conversion unit 7 may convert the format of the video to the output video format that satisfies a relationship (m+p1)(n+q1)=(m+p2)(n+q2). This relationship means that the total number of pixels in one frame in the input video format is equal to the total number of pixels in one frame in the output video format.

Since the input video format and the output video format have equal frame frequency $f_{1F}$, the dot frequency $f_{DCLK1}$ in the input video format and the dot frequency $f_{DCLK2}$ in the output video format are brought equal to each other by satisfying the relationship mentioned above. As a result, it becomes unnecessary to convert the dot frequency when converting the format of the video, thus simplifying the video format conversion unit 7.

Embodiment 2

Embodiment 2 illustrates another example of the output video format.

Figure 8:
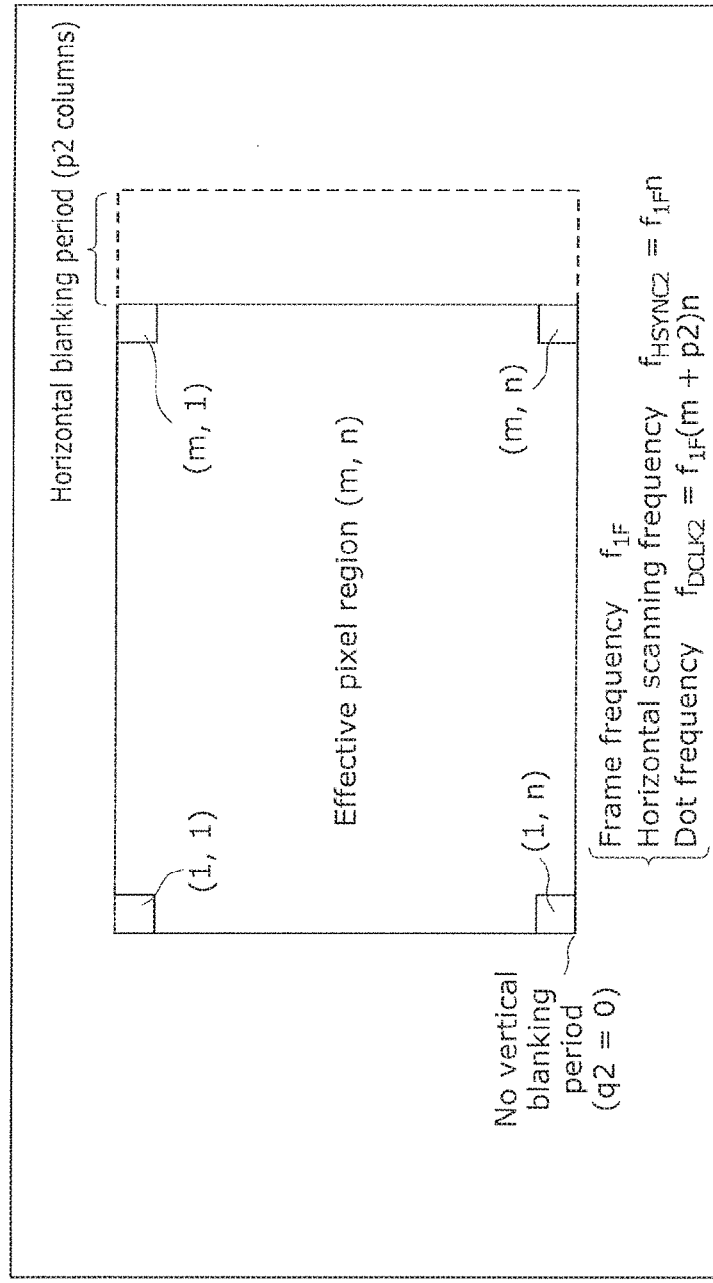
FIG. 8 is a conceptual diagram illustrating an example of an output video format according to Embodiment 2.

FIG. 8 is a conceptual diagram illustrating an example of the output video format according to Embodiment 2.

The output video format illustrated in FIG. 8 is a video format in which a frame includes an effective pixel region having n rows and m columns, and p2 columns of a horizontal blanking period, and is a video format for displaying a plurality of such frames at a frame frequency $f_{1F}$. This output video format has no vertical blanking period. This output video format has a horizontal scanning frequency $f_{HSYNC2}$ of $f_{1F}$n and a dot frequency $f_{DCLK2}$ of $f_{1F}$(m+p2)n.

Here, the frame frequency $f_{1F}$ of the output video format is equal to the frame frequency $f_{1F}$ of the input video format.

In Embodiment 2, the display operation described in Embodiment 1 is performed according to the output video format noted above.

Figure 9:
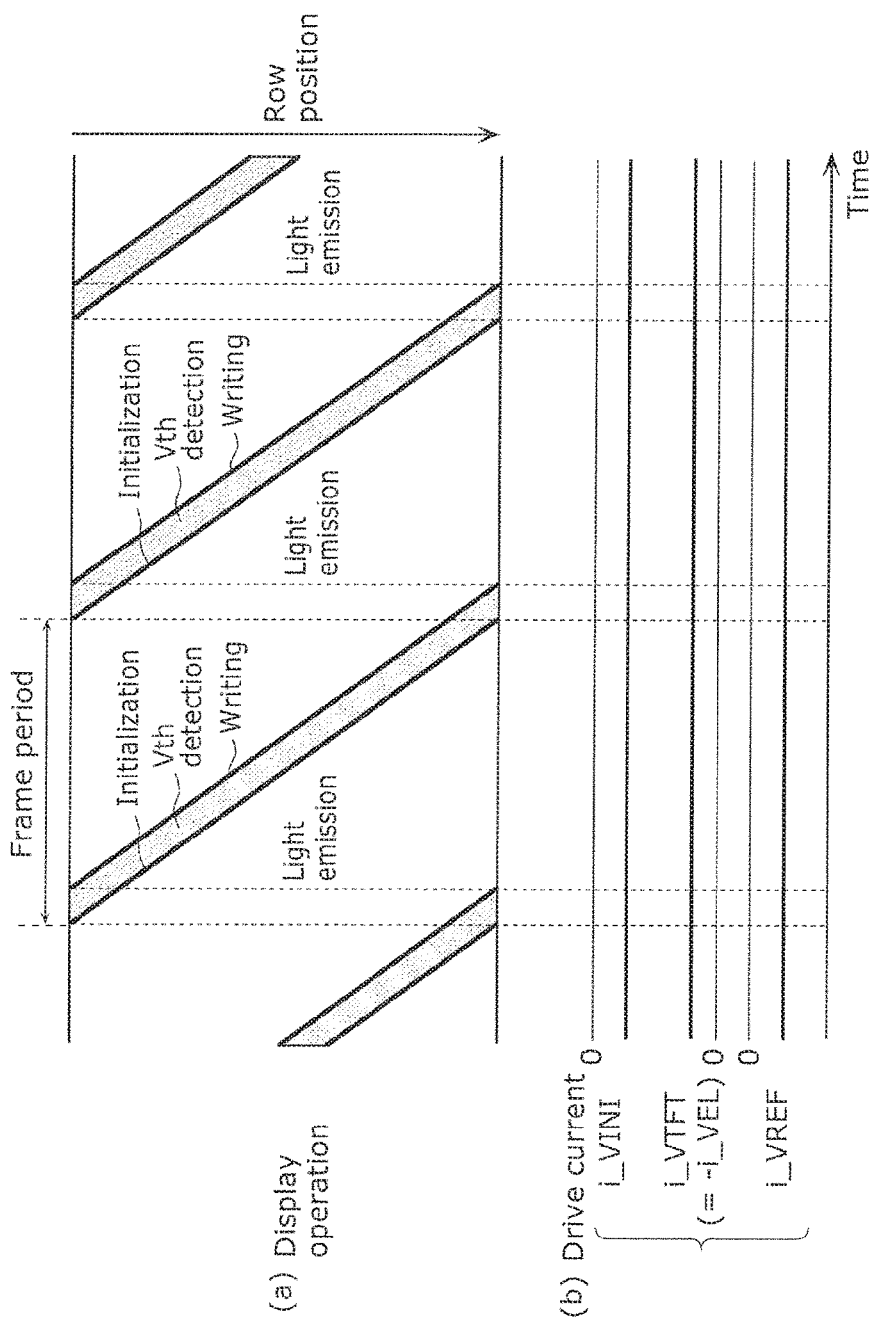
FIG. 9 is a timing chart illustrating in (a) and (b) an example of a video display operation according to Embodiment 2.

FIG. 9 is a timing chart illustrating an example of the video display operation according to Embodiment 2. Similarly to FIG. 4, FIG. 9 illustrates (a) an example of the display operation in the display unit and (b) an example of the variations over time in the drive current in the entire display unit when a video is displayed according to the output video format in FIG. 8.

As illustrated in (a) of FIG. 9, the video is displayed according to the output video format having no vertical blanking rows. Consequently, since the vertical scanning does not circulate among the vertical blanking rows, the display unevenness caused by the variations in drive current is resolved as illustrated in (b) of FIG. 9.

In the above configuration, the video format conversion unit 7 may convert the format of the video to the output video format that satisfies a relationship (m+p1)(n+q1)=(m+p2)n, q2=0. In other words, the total number of pixels in one frame in the input video format may be equal to the total number of pixels in one frame in the output video format.

When this relationship is satisfied, the dot frequency $f_{DCLK1}$ in the input video format is equal to the dot frequency $f_{DCLK2}$ in the output video format. Thus, it becomes unnecessary to convert the dot frequency at the time of converting the format of the video, making it possible to simplify the video format conversion unit 7.

Figure 10:
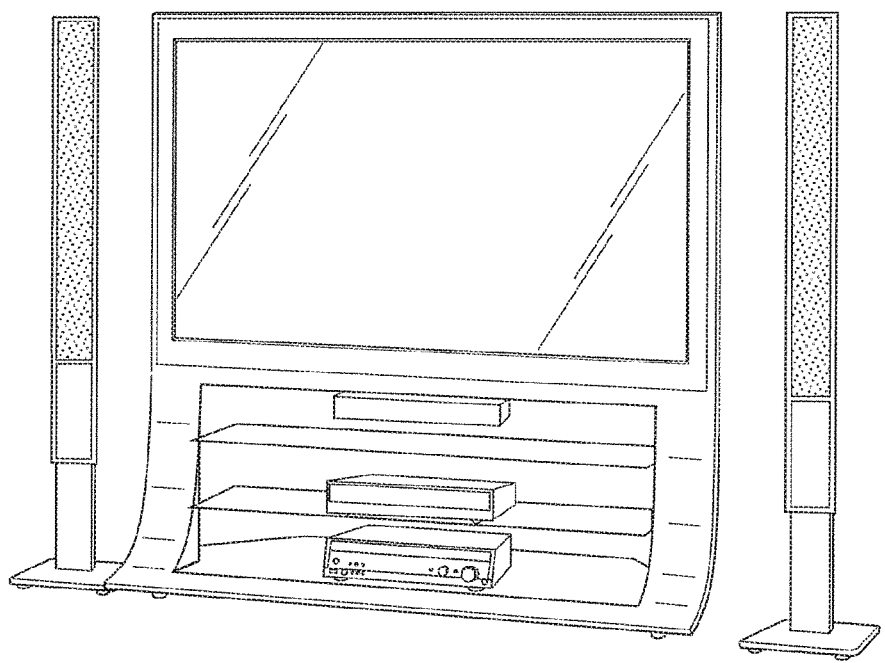
FIG. 10 illustrates an external appearance of a flat-screen television (TV) having a built-in video display device.

The video display device according to an aspect disclosed herein is built in a flat-screen TV as illustrated in FIG. 10. With the incorporation of the video display device according to the present invention, it is possible to achieve a flat-screen TV whose display unevenness caused by the variations in the drive current is suppressed and that is capable of displaying a high quality video.

Although the video display device according to one or more aspects of the present invention has been described above based on the embodiments, the present invention is not limited to these embodiments. As long as not departing from the purport of the present invention, many variations of the above embodiment conceivable by a person skilled in the art and modes configured by the combination of the structural components in different embodiments may be included in the scope of one or more aspects of the present invention.

INDUSTRIAL APPLICABILITY

The present invention can be used widely as a video display device.

The invention claimed is:

1. A video display device, comprising:
a display including a plurality of pixel portions that are arranged in a matrix having n rows and m columns;
a processor;
a memory including instructions that, when executed by the processor, cause the processor to perform operations including:
   obtaining a video represented in an input video format for displaying, at a predetermined frame frequency, a plurality of frames each including an effective pixel region having n rows and m columns, p1 columns of a horizontal blanking period, and q1 rows of a vertical blanking period;
   converting a format of the video to an output video format for displaying, at the predetermined frame frequency, a plurality of frames each including the effective pixel region having n rows and m columns, p2 columns of the horizontal blanking period, and q2 rows of the vertical blanking period, where q2 is less than q1; and
a display driver configured to display the video row by row in the display at a horizontal scanning frequency in the output video format,
wherein the operations further include:
   storing the video for each frame in a frame memory;
   generating a horizontal synchronization signal at the horizontal scanning frequency indicated by $f_{HSYNC2}$ and a dot clock signal at a dot frequency indicated by $f_{DCLK2}$ based on relationships $f_{HSYNC2}=f_{1F}(n+q2)$ and $f_{DCLK2}=f_{1F}(m+p2)(n+q2)$, where $f_{1F}$ denotes the predetermined frame frequency; and
   reading out video data for each pixel from the frame memory based on the dot clock signal, and supplying the video data that has been read out and the horizontal synchronization signal to the display driver, and the display driver is further configured to sequentially drive, row by row, a display operation in the pixel portions disposed in one of the rows of the display in synchronization with the horizontal synchronization signal.

2. The video display device according to claim 1, wherein the processor is configured to convert the format of the video to the output video format that satisfies a relationship (m+p1)(n+q1)=(m+p2)(n+q2).

3. The video display device according to claim 1, wherein the processor is configured to convert the format of the video to the output video format that satisfies a relationship (m+p1)(n+q1)=(m+p2)n, q2=0.

4. A video display method, comprising:
obtaining a video represented in an input video format for displaying, at a predetermined frame frequency, a plurality of frames each including an effective pixel region having n rows and m columns, p1 columns of a horizontal blanking period, and q1 rows of a vertical blanking period;
converting a format of the video to an output video format for displaying, at the predetermined frame frequency, a plurality of frames each including the effective pixel region having n rows and m columns, p2 columns of the horizontal blanking period, and q2 rows of the vertical blanking period, where q2 is less than q1; and
displaying the video row by row in a display at a horizontal scanning frequency in the output video format, the display including a plurality of pixel portions that are arranged in a matrix having n rows and m columns,
wherein the converting includes:
storing the video for each frame in a frame memory;
generating a horizontal synchronization signal at the horizontal scanning frequency indicated by $f_{HSYNC2}$ and a dot clock signal at a dot frequency indicated by $f_{DCLK2}$ based on relationships $f_{HSYNC2}=f_{1F}(n+q2)$ and $f_{DCLK2}=f_{1F}(m+p2)(n+q2)$, where $f_{1F}$ denotes the predetermined frame frequency; and
reading out video data for each pixel from the frame memory based on the dot clock signal, and supplying the video data that has been read out and the horizontal synchronization signal to a display driver, and
the displaying includes sequentially driving, by the display driver and row by row, a display operation in the pixel portions disposed in one of the rows of the display in synchronization with the horizontal synchronization signal.

5. A non-transitory computer-readable recording medium that stores a program that, when executed by a computer, causes a computer to execute a video display method, the video display method comprising:
obtaining a video represented in an input video format for displaying, at a predetermined frame frequency, a plurality of frames each including an effective pixel region having n rows and m columns, p1 columns of a horizontal blanking period, and q1 rows of a vertical blanking period;
converting a format of the video to an output video format for displaying, at the predetermined frame frequency, a plurality of frames each including the effective pixel region having n rows and m columns, p2 columns of the horizontal blanking period, and q2 rows of the vertical blanking period, where q2 is less than q1; and
displaying the video row by row in a display at a horizontal scanning frequency in the output video format, the display including a plurality of pixel portions that are arranged in a matrix having n rows and m columns,
wherein the converting includes:
storing the video for each frame in a frame memory;
generating a horizontal synchronization signal at the horizontal scanning frequency indicated by $f_{HSYNC2}$ and a dot clock signal at a dot frequency indicated by $f_{DCLK2}$ based on relationships $f_{HSYNC2}=f_{1F}(n+q2)$ and $f_{DCLK2}=f_{1F}(m+p2)(n+q2)$, where $f_{1F}$ denotes the predetermined frame frequency; and
reading out video data for each pixel from the frame memory based on the dot clock signal, and supplying the video data that has been read out and the horizontal synchronization signal to a display driver, and
the displaying includes sequentially driving, by the display driver and row by row, a display operation in the pixel portions disposed in one of the rows of the display in synchronization with the horizontal synchronization signal.

* * * * *